United States Patent [19]

Uemura

[11] Patent Number: 4,651,204
[45] Date of Patent: Mar. 17, 1987

[54] JAMMING SIGNAL GENERATING CIRCUIT

[75] Inventor: Hiroki Uemura, Tokyo, Japan

[73] Assignee: Pioneer Electronic Corporation, Tokyo, Japan

[21] Appl. No.: 787,209

[22] Filed: Oct. 15, 1985

[30] Foreign Application Priority Data

Oct. 15, 1984 [JP] Japan .................................. 59-216878

[51] Int. Cl.[4] .......................... H04K 1/02; H04K 1/00; H04K 3/00; H04N 7/167
[52] U.S. Cl. .......................................... 380/7; 455/1; 380/20
[58] Field of Search ..................... 358/114, 118; 455/1; 179/1.5 M

[56] References Cited

U.S. PATENT DOCUMENTS 4,148,064 4/1979 Reed ..................................... 358/118
4,342,119 7/1982 Seidl ...................................... 455/1

Primary Examiner—Stephen C. Buczinski
Assistant Examiner—Melissa Koltak
Attorney, Agent, or Firm—Sughrue, Mion, Zinn, Macpeak & Seas

[57] ABSTRACT

A jamming circuit for a CATV system in which the jamming signal is offset in frequency by a voltage controlled oscillator and then mixed with the unjammed television signal. A difference component is obtained from the mixer and is attenuated to a fixed level. This signal is then 100%-AM-modulated by a low frequency signal. The AM-modulated signal is mixed with an output from the voltage controlled oscillator and the double side bands are superimposed on the television line feeding the terminal of the subscriber.

4 Claims, 2 Drawing Figures

JAMMING SIGNAL GENERATING CIRCUIT

BACKGROUND

The present invention relates to a jamming signal generating circuit for generating an interfering signal, which is employed in a CATV system. The CATV system has a distribution unit for distributing signals from a branching line to respective terminals. The distribution unit includes a central viewing control system for controlling subscriber viewing according to a subscriber payment program.

The present inventor has described such an apparatus which is a central viewing control system for a CATV system. For example, see Japanese Laid-Open Application No. 59-101600. In this system, the level of jamming signal is established at a fixed level and the jamming signal is produced at high speed.

However, because of the fixed establishment of the level of the jamming signal it is difficult to constantly maintain a desirable level ratio relative to any level condition of a television signal. Therefore, when the level ratio falls outside of the effective range, there is the disadvantage that the effect of scrambling decreases. Furthermore, as a result of the high-speed production of the jamming signal, an extremely high-speed responsive circuit is required when the level control is performed by AGC (automatic gain control).

SUMMARY OF THE INVENTION

Accordingly, it is an object of this invention to provide a jamming system which adjusts to the level of the signal to be jammed.

This invention contemplates providing a jamming signal generating circuit in which the jamming signal level varies in accordance with the variation of the television signal and the ratio between the television signal level and the jamming signal level is maintained at a predetermined value so that the scrambling effect can be maintained.

To achieve the object of the invention, the present invention provides a system for scrambling a picture by adding an interfering signal to a television signal. A distribution unit distributes signals from a branching line to respective terminals. Within the distribution unit, a difference frequency component is obtained between the television signal and an output signal of a voltage control oscillator. A band-pass filter passes the difference frequency component. A variable attenuator establishes the level of the difference frequency component. An AM modulation circuit and a low-frequnecy oscillator AM modulates an output of the variable attenuator. A difference frequency component is obtained between an output signal of the AM modulation circuit and another output signal of the voltage control oscillator and is used as the jamming signal superimposed on the television line.

DETAILED DESCRIPTION OF THE PREFERRED EMBODIMENT

Figure 2:
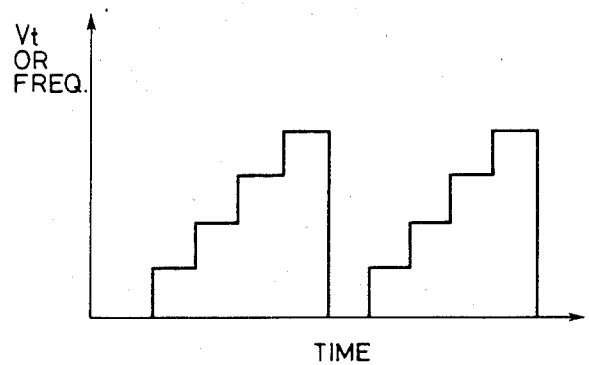
FIG. 2 is a graph of the time dependence of both the voltage input and the output frequency of the voltage controlled oscillator.

In the figure, within a distribution unit 10, an RF wide-band amplifier 12 amplifies a television signal that has been branched from a feeder line 14. The television signal has a channel with carrier at a frequency $f_{vn}$. A mixer 16 mixes the television signal with a signal from a voltage controlled oscillator 18, hereafter referred to as the VCO. The VCO 18 is fed by a voltage $V_t$. The voltage $V_t$ is a stepped voltage signal as illustrated in FIG. 2. Each of the steps is a voltage corresponding to one of a multiplicity of television channels. The VCO 18 converts its input voltage $V_t$ to two outputs having a frequency $f_{on}$ corresponding to $V_t$. This output frequency is set to be a sum $f_{on}=f_{jn}+f_L$ of a jamming frequency $f_{jn}$ and a predetermined frequency $f_L$. This addition of a predetermined frequency to the jamming signal is described in Japanese Laid-Open Patent Applications Nos. 59-101609 and 59-101610. The jamming frequency $f_{jn}$ for a particular channel is chosen to be offset from the channel carrier frequency $f_{vn}$ by 100 kHz to 500 kHz. In most of the following discussion, only a single channel carrier will be considered. The jamming of the different channels will be accomplished in a time multiplexed fashion.

Included within the output of the mixer 16 is a signal at the frequency $f_{on}-f_{vn}=f_{jn}-f_{vn}+f_L$, which will be called the displaced difference frequency. This frequency represents a signal which is a difference between the jamming carrier and the TV carrier frequency offset to the neighborhood of $f_L$. The voltage $V_t$ causes the frequency $f_{jn}$ to follow the frequency of the TV carrier frequency $f_{vn}$, with an attendant change in the frequency $f_{on}$ of the output of the VCO 18. Nonetheless, the output of the mixer 16 can be maintained at a specified frequency regardless of the TV carrier frequency $f_{vn}$.

A band-pass filter 20 passes only the the signal at the displaced difference frequency $f_{jn}-f_{vn}+f_L$, which is then amplified by a narrow-band amplifier 22. Since $f_{jn}-f_{vn}$ is generally a predetermined difference, this displaced difference frequency is passed regardless of the channel frequency $f_{vn}$, now being jammed. Other channels are blocked. The amplitude of the passed signal, however, depends on the amplitude of the television signal $f_{vn}$. A variable attenuator 24 receives the amplified displaced difference frequency signal and adjusts the level of that signal to a predetermined level. This adjustment avoids saturation in the later stages. More importantly, the level is chosen in view of the level of the television signal $f_{vn}$, as will be described later.

The adjusted displaced difference frequency signal is then AM-modulated in an AM modulator 26 by a sinusoidal signal from a low frequency oscillator 28. The AM-modulation is 100%-AM-modulation and the frequency of the signal from the low frequency oscillator 28 is $f_{jn}-f_{vn}$, that is, the difference between the jamming signal and the television carrier signal, which can be a predetermined difference of the previously mentioned 100–500 kHz. In the AM-modulation double side band signals at the frequencies $(f_{on}-f_{vn})\pm(f_{jn}-f_{vn})$ are derived from the signal at the displaced difference frequency $f_{jn}-f_{vn}+f_L$. Considering the predetermined frequency explicitly, the double side band frequencies are $(f_{jn}+f_L-f_{vn})\pm(f_{jn}-f_{vn})$.

The double side band signals are then mixed in a down mixer 50 which also receives a signal at the frequency $f_{jn}+f_L$ from the VCO 18. The signals taken at difference frequencies in the down mixer 50 are the double side bands at frequencies $f_{jn}$ and $2f_{vn}-f_{jn}$. These double side bands are amplified in a wide-band amplifier 30 and switched by an RF switch 32 to be superimposed as a jamming or interfering signal on a drop line 34. The drop line 34 conveys the television signal from the feeder line 14 to a subscriber's terminal, not shown. The RF switch 32 is controlled by a switching signal 36 and may be separately provided for each subscriber terminal. The drop line 34 is connected to one output of a distributor 38 that receives the television signal from the feeder line 14. The input of the RF switch 32 receives as its primary input one of the outputs of another distributor 40 receiving the jamming signal from the amplifier 30 and the RF switch 32. The level to which the variable attenuator 24 adjusts the signal level is chosen such that the output of the RF switch 32 is larger than the television signal $f_{vn}$ at the output of the distributor 38. A 10 db signal difference is appropriate.

The function of the switching signal is discussed in Japanese Patent Application No. 101611/84. Referring back to FIG. 2, there are a number of channels which may be potentially jammed depending upon which channels have been authorized or not for the subscriber attached to the illustrated drop line 34. A microprocessor synchronizes the steps of the voltage $V_t$ with the switching signal 36 applied to the RF switch 32. During the time in which the jamming signal of frequency $f_{jn}$ corresponds to a channel to be jammed for this subscriber, the microprocessor closes the RF switch 32 to superimpose the jamming signal onto the drop line 34.

Figure 1:
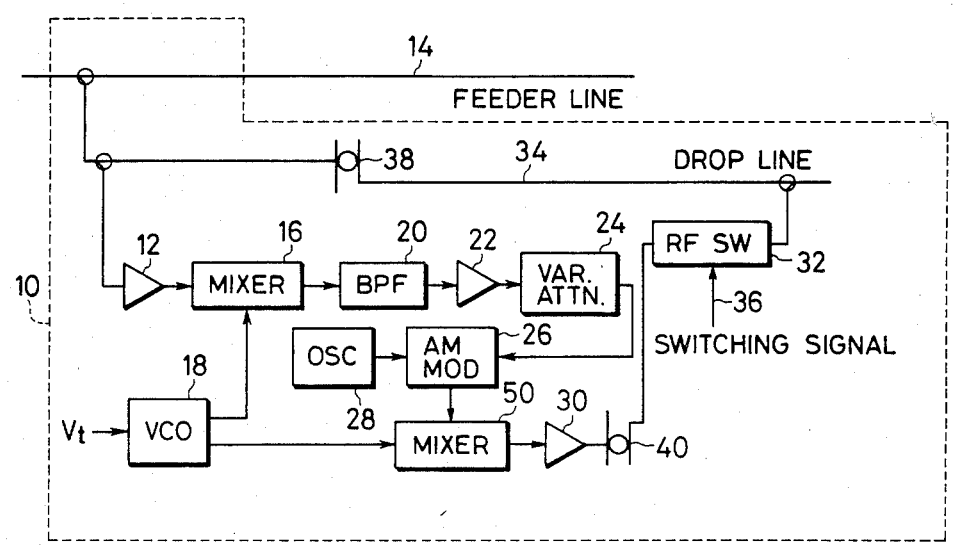
FIG. 1 is a schematic diagram of the electrical circuit of the present invention.

It should be mentioned that the distribution unit 10 of FIG. 1 is designed to be used with more than one subscriber. Each subscriber has a different drop line 34 attached to a different output of the distributor 38 and has his own RF switch 32 receiving a jamming signal from a different output of the distributor 40. The switching signal 35 applied to each of the RF switches 32 depends upon the channels authorized for that particular subscriber. Thus the same jamming signal can be selectively imposed upon the drop lines 34 of different subscribers authorized to received different channels.

The invention relies on the local oscillation at the down mixer 50 being a frequency present in the signal related to the television signal which is also fed to the down mixer 50. Thus, even if the television signal level varies significantly, the jamming signal level varies in accordance with the variation of the television signal level. Accordingly, the scrambling effect for the television signal on the drop line 34 can be maintained at a desired ratio.

I claim:

1. In a system for scrambling a picture by adding an interfering signal to a television signal in a distribution unit distributing said television signal to one or more terminals, a jamming signal generating circuit comprising:

a voltage controlled oscillator receiving a stepped voltage;

first means for obtaining a first difference frequency component between a television signal and an output signal of a voltage control oscillator;

a band-pass filter for passing said first difference frequency component;

a variable attenuator for establishing a level of said first difference frequency component;

an AM modulation circuit and a low-frequency oscillator for AM modulation of an output of said variable attenuator; and second means for obtaining a second difference frequency component between an output signal of said AM modulation circuit and an output signal of said voltage control oscillator, an output of said second obtaining means being said interfering signal.

2. A jamming signal generating circuit as recited in claim 1, wherein said low frequency oscillator produces a signal at a frequency which is a difference between a desired jamming frequency and a carrier frequency of said television signal and wherein said voltage controlled oscillator produces a signal at a frequency which is the sum of said desired jamming frequency and a predetermined frequency offset.

3. A jamming signal generating circuit as recited in claim 2, wherein said AM modulation circuit 100%-AM-modulates said output of said variable attenuating means.

4. A jamming signal generating circuit as recited in claim 1, further comprising a controllable switch coupling said interfering signal to a line conveying said television signal to at least one of said terminals.

* * * * *